UNITED STATES PATENT OFFICE.

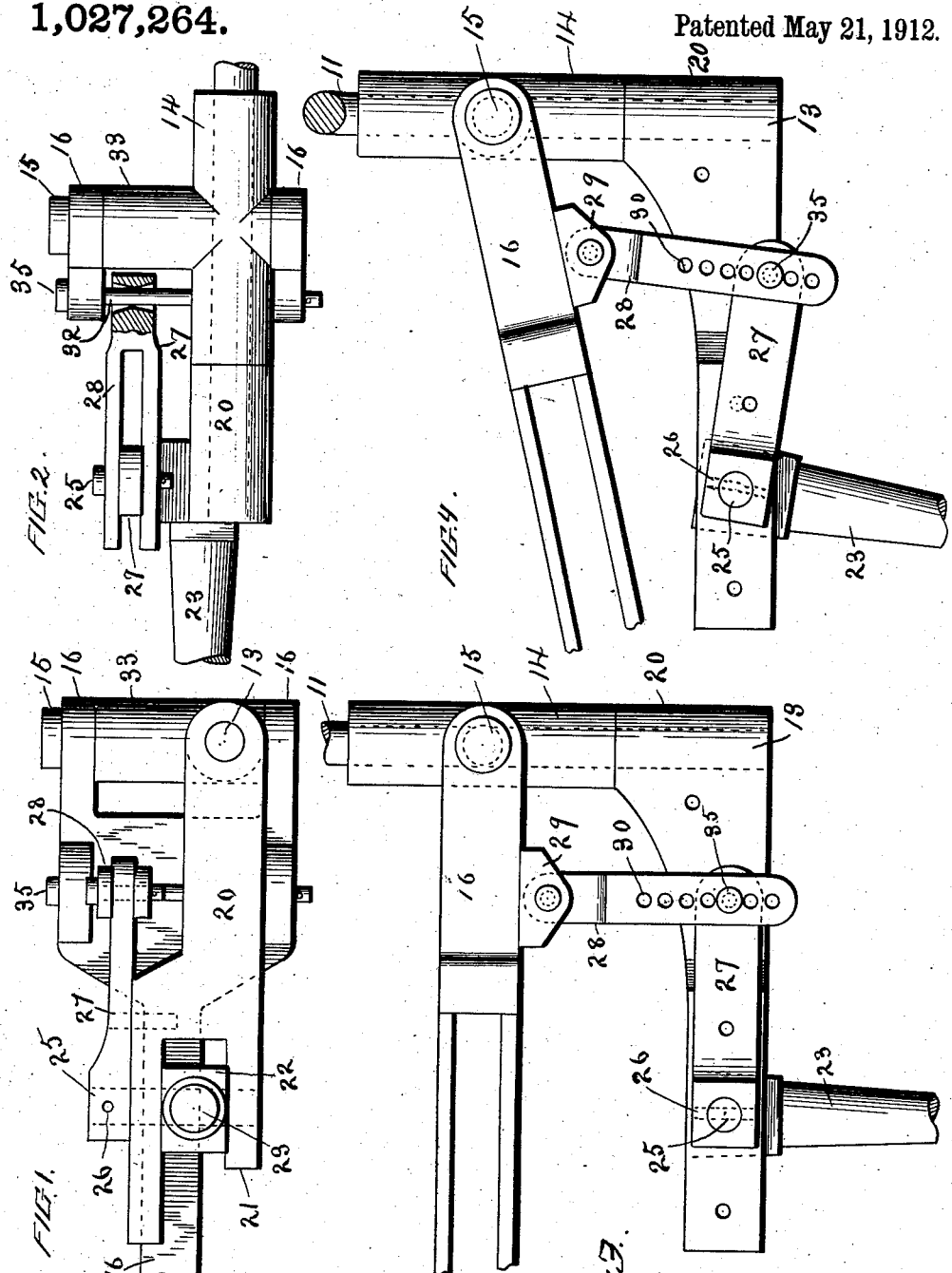

CLARENCE LICKEY, OF ROUND HILL, VIRGINIA.

CULTIVATOR ATTACHMENT.

1,027,264.      Specification of Letters Patent.      Patented May 21, 1912.

Application filed September 25, 1911. Serial No. 651,192.

*To all whom it may concern:*

Be it known that I, CLARENCE LICKEY, a citizen of the United States, residing at Round Hill, in the county of Loudoun and State of Virginia, have invented certain new and useful Improvements in Cultivator Attachments; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a cultivator and particularly to a construction of a wheel cultivator in which the beams carrying the plows are adapted to shift the wheels as they are moved in a horizontal plane to properly cultivate the plants.

The invention has for an object to provide a pivotal bearing wheel axle adjustably connected to a pivot cultivator beam in order to effect a simultaneous adjustment of its parts.

Other and further objects and advantages of the invention will be hereinafter set forth and the novel features thereof defined by the appended claim.

I illustrate my invention in the accompanying drawings, in which:—

Figure 1 is a detail in elevation of the wheel bearing member and showing an end view of the stub axle. Fig. 2 is an end view of the construction shown in Fig. 1. Fig. 3 is a top plan view, and Fig. 4 is a similar view showing the parts in differently adjusted positions.

Like numerals of reference refer to like parts in the several figures of the drawings.

11 designates the lower part of an arched axle which is broken away and upon the lower end of which is mounted a rotatable sleeve 14, only one of which is illustrated in the drawings, both sides being of similar construction, and each sleeve has a vertical bearing pin 15 upon which the plow beam 16 is pivotally mounted for movement in a horizontal plane. Upon each end 13 of the arched axle is mounted a wheel bearing member 20 and which member has a bifurcated end 21, as shown clearly in Fig. 1 of the drawings, and designed to carry a bearing box 22 in which the wheel axle 23 is pivotally mounted and adapted to carry the usual traveling wheel, not shown. Said bearing box 22 has extended therefrom a pivotal shaft 25, the upper end of which is connected by a pin 26 with the lever arm 27 extending toward the front of the machine. Said arm 27 is connected with the plow beam 16 by means of an adjustable link 28 pivotally mounted in ears 29 thereon and provided with a series of apertures 30 by which the relative movements of the parts may be adjusted and secured through the medium of a pin 35 extending through registering apertures in the link of the lever arm 27.

The link 28, shown clearly in Fig. 2 of the drawings, is bifurcated to embrace the lever arm 27 and at its pivotal end is formed with a bearing 32, permitting a limited vertical movement as well as a transverse movement which will allow a free movement of the parts when shifted. In Fig. 2 of the drawings, the beam bearing sleeve, it will be noted, is provided with an extension 33 to receive the pin 15 upon which the beam 16 is mounted, the pivotal end of the beam being bifurcated to embrace the sleeve 14.

It will be understood that the wheels and the beam, which have the link connections shown, are shifted simultaneously by any suitable mechanism, preferably handles not shown.

In operation, as the cultivator is shifted to operate upon rows of plants and to avoid contact or other obstructions in the ground, the parts may be shifted, as shown in Fig. 4, and thus properly direct the travel of the cultivator in the direction desired.

It will be seen that the construction described presents a simple, efficient and easily operated means by which the wheels of a traveling cultivator may be adjusted in accordance with the shifting of the beam.

Having thus fully described my invention, what I claim to be new and desire to secure by Letters Patent is:—

A cultivator having a draft frame, an arched axle fastened thereto, and having laterally projecting portions, a slotted plate fastened to the outer end of each laterally projecting end of the arched axle, a stub axle having a shank portion mounted in the slot of said plate, a pivotal pin passing through said bearing and shank portion, a bar fixed to said pivotal pin, a sleeve mounted upon each laterally extending end of the arched axle, a plow beam pivotally connected to said sleeve, and pivotal link connections between the plow beam and said bar which is secured to the pivotal pin, as shown and described.

In testimony whereof I hereunto affix my signature in the presence of two witnesses.

CLARENCE LICKEY.

Witnesses:
A. J. SIMPSON,
W. E. BALLENGER.

Copies of this patent may be obtained for five cents each, by addressing the "Commissioner of Patents, Washington, D. C."